Feb. 26, 1963
H. E. NOVINGER
3,079,529
AUTOMOBILE HEADLIGHT
Filed Dec. 24, 1958
2 Sheets-Sheet 1
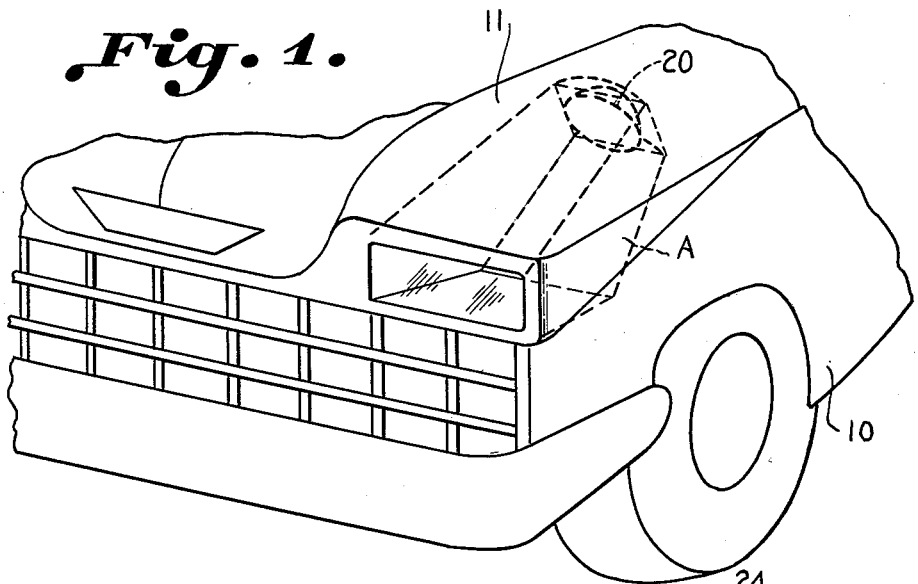
Fig. 1.
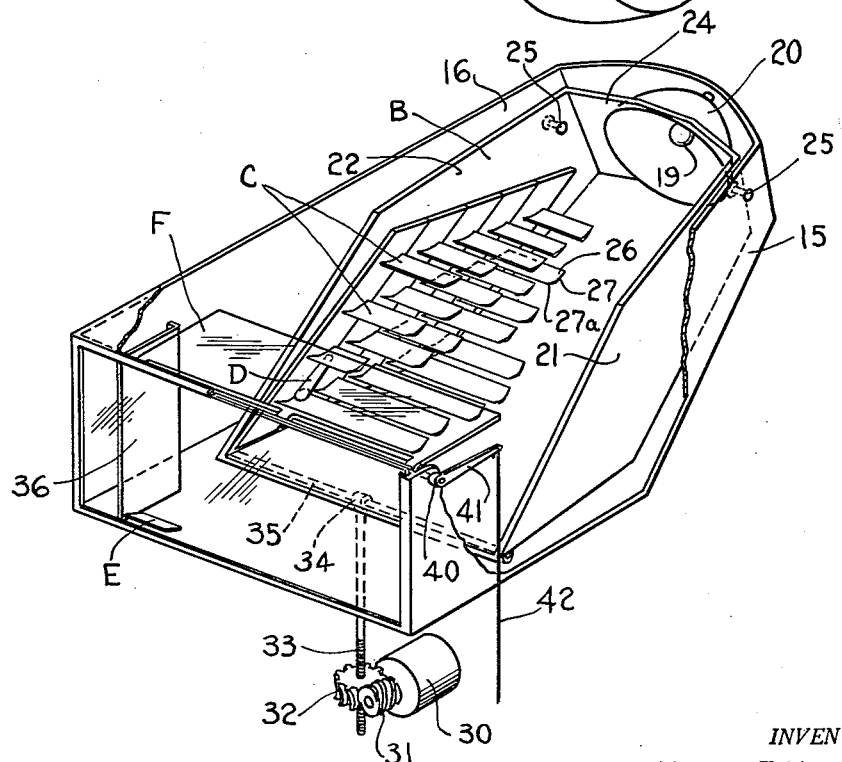
Fig. 2.
INVENTOR.
HARRY E. NOVINGER
ATTORNEY

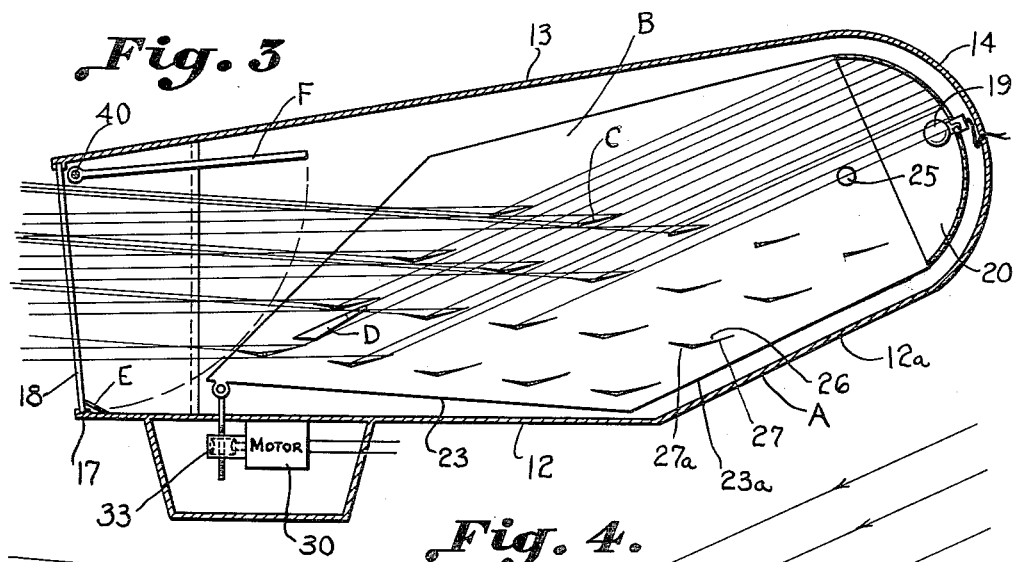
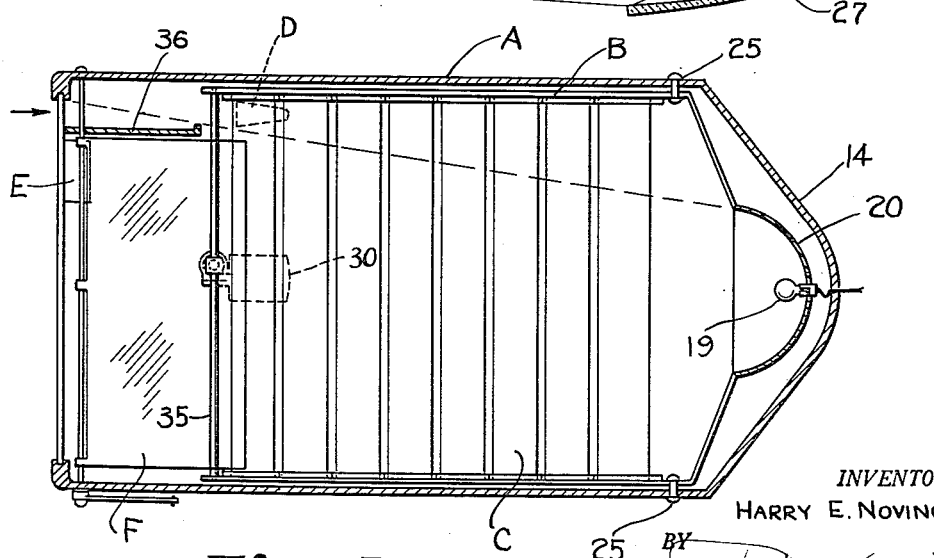

United States Patent Office 3,079,529
Patented Feb. 26, 1963

1

3,079,529
AUTOMOBILE HEADLIGHT
Harry E. Novinger, Shaw Air Force Base, S.C.
Filed Dec. 24, 1958, Ser. No. 782,860
6 Claims. (Cl. 315—82)

This invention relates to headlights for automobiles and more especially to an improved headlight structure which provides for the emission of a flat beam of light and which is automatically controllable by light received from oncoming vehicles and the like.

Many efforts have been made in the past to concentrate the beam of light emitted from a sealed beam automobile headlight, however, such efforts have met with only limited success. In most of the attempts changes in the contour of the casing have been made in order to accomplish the desired purpose. It is evident that light reflecting at many angles from its source within the sealed beam unit cannot possibly be adequately controlled by such variations in the shape of the casing.

Accordingly, it is an object of this invention to provide an improved sealed beam automobile headlight which will result in an improved concentration of the light emitted therefrom.

Another object of this invention is to provide an improved automobile headlight in which a plurality of baffles or light reflecting surfaces are provided for effectively controlling the light emitted by the light source within the headlight so as to concentrate the light in a flat beam.

Another object of this invention is to provide an automatically operable means for controlling a substantial portion of the light emitted by an automobile headlight which is self-adjusting responsive to light from a source in front of the vehicle.

Another object of this invention is to provide a headlight structure in which a highly concentrated beam of light is emitted having no spurious radiations above a plane of greatest intensity at the top of the beam.

An important object of the invention is the provision of an automobile headlight which will emit a beam of light which is flat at its top and of greatest intensity at this point so as to provide a beam of light of maximum effectiveness for lighting a road and which may be easily adjusted so as to avoid inconvenience to oncoming vehicles.

Another object of this invention is to provide an improved headlight structure which may be automatically and manually adjusted so as to change the position of the beam of light to accommodate for varied elevations or depressions in a road surface.

Another object of this invention is to provide a headlight which permits the positioning of a light filter which may be raised and lowered to provide a fog light.

Still another object of this invention is to provide a reflector within the improved headlight so as to direct light upwardly and outwardly to illuminate road signs and the like.

Another object of this invention is the provision of a headlight for an automobile having an arrangement of reflectors and shields such that the maximum emission of light occurs at the upper extremities of such baffles so as to combine the main parallel rays from the source of light in beams of light whose upper portions are parallel to each other thus forming for all practical purposes a single beam of light and preventing light from passing at angles above the upper portion of this main beam of light.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGURE 1 is a perspective view showing the position of a headlight constructed in accordance with the present invention in operative position in an automobile, FIGURE 2 is an enlarged perspective view of a headlight constructed in accordance with the present invention with parts broken away for clarity of illustration, FIGURE 3 is an enlarged longitudinal sectional elevation of the structure shown in FIGURE 2, FIGURE 4 is an enlarged longitudinal sectional elevation showing the sensing mechanism and baffle structure of the present invention in detail, and FIGURE 5 is a plan view showing some of the parts in section for clarity of illustration.

Referring more particularly to the drawings the numeral 10 refers to an automobile having a fender 11 which may be of any suitable type. The automobile headlight, an embodiment of which is shown constructed in accordance with the teachings of the present invention, has a casing A so positioned within the upper portion of the fender as to permit the positioning of the lens in its normal position in the front of the fender 11. The casing A is substantially rectangular in cross-section and tapers upwardly from the front toward the source of light positioned in the rear portion of the casing A. The casing encloses a frame B which includes the source of light and a pair of vertical spaced aligned frame members which are suitably connected and which are pivotedly secured adjacent the rear thereof to the rear portion of the casing A. A plurality of spaced rows of baffles or reflecting and non-reflecting surfaces C are carried by the frame B and are so positioned as to exert direct control upon the light emanating from the light source. The frame B is pivoted within the casing by suitable means which are under control of a photo electric cell D which is actuated by light from oncoming vehicles and the like. This sensing means thus controls the means for controlling the light emanating from the headlight so as to prevent inconvenience to the drivers of oncoming vehicles and so as to obtain optimum lighted distances forward. A small reflector E is so positioned within the natural cavity formed within the casing A so as to reflect light outwardly and upwardly to the side so as to illuminate road signs and the like. A suitable filter F is provided with means for moving same downwardly over inside of the lens of the headlight so as to convert the headlight into a fog light or other colored light if desired.

The elongated casing A has a horizontally disposed base 12 and an upwardly inclined base portion 12a. The upper portion of the casing A is indicated at 13 and slopes upwardly from the front. The base portion 12 and the upper portion 13 are bridged by an arcuate rear portion 14. A pair of sides 15 and 16 complete the casing. A groove 17 for accommodating the lens 18 which may be of standard type plate glass is also provided.

A suitable source of illumination is mounted on frame B and positioned within the casing adjacent the rear arcuate portion 14 in the form of an electric light 19 which is carried within the usual reflector 20. The light 19 and the reflector 20 are so positioned as to direct the beams of light of maximum intensity emanating therefrom downwardly following generally the taper of the elongated housing A produced by the base portion 12a and the upper portion 13. This is important because the reflector and shield-reflector combination baffles C are positioned in a series of spaced rows so as to reflect the light forwardly, sidewardly and downwardly but not upwardly in a series of overlapping high intensity well defined beams of controlled light. Since these baffles C are positioned across the entire path of the light, the beam emitted from the headlight may be controlled with extraordinary accuracy both as to vertical direction and as to the elimination of spurious radiations above the main beam of maximum intensity.

The baffles C are shown positioned in a plurality of diagonal spaced rows. The reflector portions thereof are generally of a rectangular elongated shape being formed with a somewhat concave cross-section. The baffles C are carried between a pair of vertical spaced parallel members 21 and 22 forming the major portion of the frame B. The lower portions 23 and 23a of the support follow the contour of the base 12 and base portion 12a respectively. A rear support 24 bridges these supports and serves as a support for the reflector 20 of the light source. The frame B is pivoted on pins 25 which project into the side portions 15 and 16 so that the entire frame B carrying the baffles C and light source 20 may be pivoted within the casing A. It should be noted that each of the vertical spaced parallel members of frame B which holds one end of each of the reflectors could be cast in one piece or could be constructed in several sections and joined together by welding and the like.

The baffles C each have an upper reflector surface 26 and a lower non-reflecting surface 27 which may be constructed of any desired material so as to be reflective or non-reflective. The reflectors 26 have a focal length substantially equal to or slight greater than the distance between them and the adjacent reflectors. Some of the baffles have a forwardly projecting shield or shade 27a which shields the undesired light rays from the source from striking the next lower reflector in the same series at angles which would cause reflections above the main beam of light in addition the shade 27a may have a reflective lower surface which serves to narrow the angle of the beam of light reflected by the next rearward reflector. It will be noted especially by reference to FIGURE 3 that light rays reflected at high angles of reflection from the upper reflective surface 26 of the forward most baffle of the top horizontal row are limited by the reflector's relative position to light source 20 and that said baffle limits the height of the beam produced by that row whereas the second and likewise each consecutive rearward reflector in that row must reflect light at an angle parallel with and on a line below the beam of its forward counterpart, otherwise such light would be shielded by the first mentioned reflector. In addition, it will also be noted that the special arrangement of all of the baffles C in relation to the tapering upper surface 13 of the casing A is important in that undesirable reflection at low angles of reflection from reflectors in the top row is shielded thereby. A portion of the spurious rays from the source of light 20 is substantially parallel to the upper portion 13 to be utilized as they pass between the reflectors without reflection for lighting areas directly ahead of the lens 18. Such an arrangement of baffles to the light source and to the case provides control for undesired spurious rays, allows spurious rays at angles below the main beam to pass and permits an efficient utilization of light. The top portion of the main beam beyond the focal point of its respective baffle is a line below which angle all reflective or spurious light that passes through the glass side is directed and above which the light is almost nonexistent. A similar band of light is reflected by each of the baffles and for practical applications constitutes one substantially flat high intensity beam.

FIGURES 4 and 5 show the positioning of a photoelectric cell D in such a position as to receive light from sources ahead of the seal beam unit under discussion. The photo-electric cell D is adapted to be actuated by light of predetermined intensity so as to actuate means for automatic moving of the frame B up and down so as to follow the source of light thus assuring that the light emitted by its seal beam unit will not interfere with oncoming vehicles and to assure optimum forward lighted distances under diverse road elevations and reflective qualities of the road surfaces. The effect of the actuation of the solenoid is to drive a small motor 30 or other source of energy. The motor 30 is shown driving a worm 31 which meshes with a worm gear 32 threadably carried by a threaded shaft 33. The shaft 33 is connected at the top by a sleeve 34 to a rod 35 carried adjacent the forward edge of the frame B. The motor 30 is preferably of the reversible type so that it may be so controlled by the photo-electric cell D as to raise and lower the frame so that the baffles C will result in the beam of light being raised or lowered.

A reflector E is shown positioned in the cavity within the casing A forwardly of the frame B so as to emit light outwardly and upwardly to the side to illuminate signs and the like while not interfering with approaching vehicles. It will be noted that a vertical longitudinally disposed shield 36 prevents light from the source from effecting the action of the photo-electric cell. The grating or colored glass filter F is shown carried by a rotatably mounted shaft 40 which is rotatably mounted within the sides 15 and 16 of the casing A. The shaft 40 has a lever arm 41 connected thereto adjacent one end of the lever arm 41 while the free end is provided with suitable linkage 42 for effecting manual operation permitting the raising and lowering of the grating F. It is to be understood that such adjustments and control can be accomplished remotely from the drivers seat.

While a preferred embodiment of the invention has been described using specific terms, such description is for illustrative purposes only, and it is to be understood that changes and variations may be made without departing from the spirit or scope of the following claims.

What is claimed is:

1. A sealed beam automobile headlight including, an elongated casing, a source of light carried within and adjacent the rear of the casing, a pivoted frame within said casing having a pair of spaced substantially vertical longitudinally disposed members, and a plurality of spaced rows of transversely disposed light reflecting baffles carried between said vertical members, whereby the light may be concentrated in a beam by the baffles and directed out of the casing.

2. The structure set forth in claim 1, in which said baffles have a partially-non-reflective surface on the lower portion thereof.

3. The structure set forth in claim 1 including, electrically operable means automatically adjusting the position of the frame about its pivot point to control the beam responsive to light emanating from other automobiles and reflective surfaces.

4. The structure set forth in claim 1 including, a reflector positioned within the casing directing light outwardly and upwardly to illuminate road signs.

5. The structure set forth in claim 1 including, a filter positioned within said casing forwardly of said frame, and means pivotally mounting said filter for movement across and away from said beam of light directed out of the casing.

6. A sealed beam automobile headlight including, an elongated casing tapering upwardly toward the rear, a pivoted frame within said casing having a pair of spaced substantially vertical longitudinally disposed members, a source of light carried within and adjacent one end of the frame, and a plurality of spaced rows of transversely disposed light reflecting baffles carried between said vertical members said baffles having a reflective upper surface and a non-reflective lower surface, whereby the light may be concentrated in a beam by the baffles and directed out of the casing.

References Cited in the file of this patent

UNITED STATES PATENTS 1,486,616    Talley                Mar. 11, 1924

(Other references on following page)

UNITED STATES PATENTS

| | | | |
|---|---|---|---|
| 2,170,552 | De Porter | Aug. 22, | 1939 |
| 2,182,987 | Hopkins | Dec. 12, | 1939 |
| 2,230,262 | Pollack | Feb. 4, | 1941 |
| 2,629,815 | Grupen et al. | Feb. 24, | 1953 |
| 2,753,487 | Bone | July 3, | 1956 |
| 2,848,639 | Urbon | Aug. 19, | 1958 |
| 2,905,850 | Arespacochaga | Sept. 22, | 1959 |

FOREIGN PATENTS

| | | | |
|---|---|---|---|
| 924,326 | France | Mar. 3, | 1947 |
| 1,235,909 | France | June 7, | 1960 |
| 465,021 | Italy | Aug. 6, | 1951 |